United States Patent
Schaller

(10) Patent No.: US 7,137,248 B2
(45) Date of Patent: Nov. 21, 2006

(54) METHOD AND DEVICE FOR CONTROLLING AN INTERNAL COMBUSTION ENGINE

(75) Inventor: Johannes Schaller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/469,202

(22) PCT Filed: Feb. 9, 2002

(86) PCT No.: PCT/DE02/00478

§ 371 (c)(1),
(2), (4) Date: Mar. 17, 2004

(87) PCT Pub. No.: WO02/066802

PCT Pub. Date: Aug. 29, 2002

(65) Prior Publication Data

US 2004/0123584 A1   Jul. 1, 2004

(30) Foreign Application Priority Data

Feb. 23, 2001   (DE) ................................ 101 08 720

(51) Int. Cl.
*F01N 3/00* (2006.01)

(52) U.S. Cl. ........................... 60/297; 60/274; 60/276; 60/285; 60/295

(58) Field of Classification Search .................. 60/274, 60/276, 285, 286, 295, 297
See application file for complete search history.

(56) References Cited

U.S. PATENT DOCUMENTS

| | | | | |
|---|---|---|---|---|
| 5,701,735 A | * | 12/1997 | Kawaguchi | 60/274 |
| 5,722,236 A | | 3/1998 | Cullen et al. | |
| 5,746,989 A | * | 5/1998 | Murachi et al. | 423/213.7 |
| 5,974,791 A | * | 11/1999 | Hirota et al. | 60/276 |
| 6,497,095 B1 | * | 12/2002 | Carberry et al. | 60/295 |
| 6,817,174 B1 | * | 11/2004 | Igarashi et al. | 60/295 |
| 6,851,258 B1 | * | 2/2005 | Kawashima et al. | 60/311 |

FOREIGN PATENT DOCUMENTS

| | | |
|---|---|---|
| EP | 0 383 187 | 8/1990 |
| EP | 0 901 809 | 3/1999 |

* cited by examiner

*Primary Examiner*—Binh Q. Tran
(74) *Attorney, Agent, or Firm*—Kenyon & Kenyon LLP

(57) ABSTRACT

A device and a method are described for controlling an internal combustion engine, in particular an internal combustion engine having an exhaust gas aftertreatment system. A parameter is determined which characterizes the intensity of a reaction in the exhaust gas aftertreatment system, starting from operating parameters which characterize the state of the internal combustion engine and/or the state of the exhaust gas aftertreatment system. When a threshold value is exceeded by the parameter, measures are introduced for reducing the reaction speed.

7 Claims, 2 Drawing Sheets

METHOD AND DEVICE FOR CONTROLLING AN INTERNAL COMBUSTION ENGINE

FIELD OF THE INVENTION

The present invention is directed to a method and a device for controlling an internal combustion engine.

BACKGROUND INFORMATION

Methods and devices for controlling an internal combustion engine are known. Internal combustion engines, especially Diesel engines, are frequently equipped with exhaust gas aftertreatment systems, which may especially include a particulate filter. To regenerate the particulate filter, temperatures above the usual exhaust gas temperatures are required. Without additional measures, the particles oxidize at ca 550 to 600° C. The lower temperature threshold for the oxidation may be reduced to about 250 to 350° C. by combining the particulate filter with a oxidation catalyst, by catalytic coating of the filter and/or by the addition of an additive.

If the particulate filter reaches a certain load, and if regeneration of the filter is not ensured because of the engine operating state, it is provided that the exhaust gas temperature is raised to the point where the particles rapidly burn off. In that case, so much heat is liberated by the oxidation that the particulate filter and the exhaust gas heat up further. This further speeds up the oxidation, the filter heating becomes even greater, and this may lead to damage of the filter under certain circumstances.

A supercritical heating of the filter may also occur if the operating manner of the engine is changed during the regeneration. A sudden transition to an overrun operation or a transition to idling operation withdraw from the particulate filter the necessary cooling by the high volume exhaust gas flow, or rather, they increase the burn-off speed by the increased supply of oxygen in the exhaust gas flow.

SUMMARY OF THE INVENTION

It is possible to prevent with certainty an uncontrolled reaction in the exhaust gas aftertreatment system by determining a parameter characterizing the intensity of a reaction in the exhaust gas aftertreatment, starting from operating parameters characterizing the state of the internal combustion engine and/or the state of the exhaust gas aftertreatment system, and introducing measures for reducing the reaction speed when a threshold value is exceeded. In particular, in a particulate filter, an undesired heating of the particulate filter during the regeneration phase may be limited to such an extent that damage to the filter may certainly be excluded.

It is especially advantageous if the parameter characterizes a reaction temperature and/or a temperature change which are brought about by the reaction in the exhaust gas aftertreatment system. That is, as the parameter, a temperature variable is used which characterizes a final temperature attainable during a possible reaction and/or a temperature increase attained that is based on the reaction. In this context, this parameter is determined starting from operating parameters of the internal combustion engine and/or of the exhaust gas aftertreatment system. Because of that, no additional sensors are required.

The essential variables starting from which the parameter is determined are variables which characterize a loading state of the exhaust gas aftertreatment system, an exhaust gas temperature, an air quantity and/or a burn-off speed. These variables have the greatest influence on the reaction and/or the temperature attained in the exhaust gas aftertreatment system.

The variable which characterizes the burn-off speed may be specified starting from variables which characterize an oxygen content in the exhaust gas and/or the exhaust gas temperature. These variables are present in the control device and/or may be ascertained from other variables without great effort.

To reduce the reaction speed, it is provided that the oxygen supply in the exhaust gas is limited.

This may be done in a particularly simple manner by reducing the quantity of fresh air supplied to the internal combustion engine and/or by metering in fuel which does not contribute to torque.

DETAILED DESCRIPTION

Figure 1:
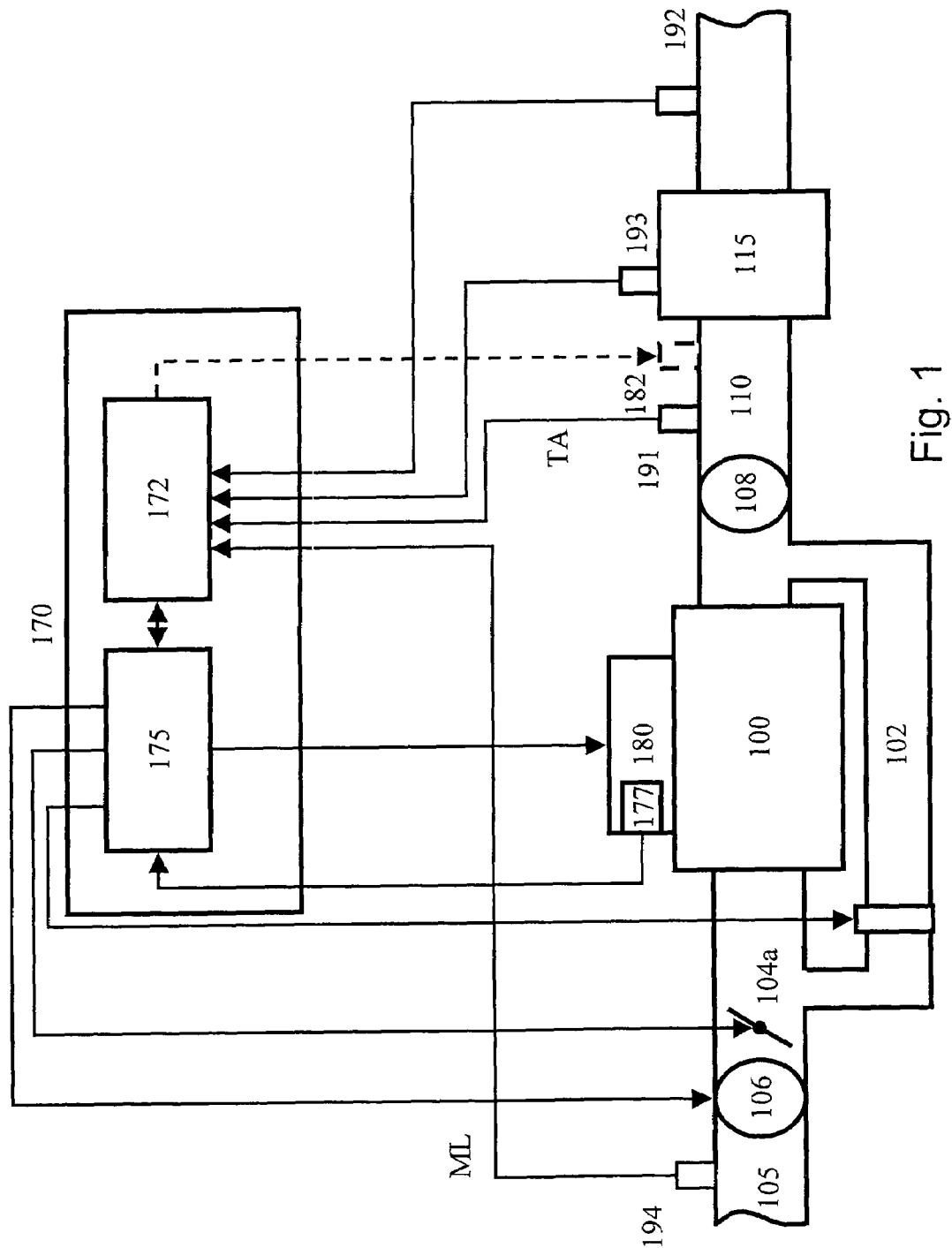
FIG. 1 shows a diagram of a system for controlling an internal combustion engine.

FIG. 1 shows the essential elements of an exhaust gas aftertreatment system of an internal combustion engine. The internal combustion engine is denoted by 100. It is supplied with fresh air through a fresh-air line 105. The exhaust gases of internal combustion engine 100 get into the environment through an exhaust pipe 110. An exhaust gas aftertreatment system 115 is positioned in the exhaust pipe. This may be a catalytic converter and/or a particulate filter. Moreover, it is possible to provide several catalytic converters for different pollutants, or combinations of at least one catalytic converter and one particulate filter.

Also provided is a control unit 170, which includes at least one engine control unit 175 and an exhaust gas aftertreatment control unit 172. Engine control unit 175 applies control signals to a fuel metering system 180. Exhaust gas aftertreatment control unit 172 exchanges signals with engine control unit 175. In one embodiment, exhaust gas aftertreatment control unit 172 applies control signals to a control element 182 which is positioned in the exhaust pipe upstream of the exhaust gas aftertreatment system or in the exhaust gas aftertreatment system.

Moreover, it is possible to provide various sensors, which feed signals to the exhaust-gas aftertreatment control unit and to the engine control unit. Thus, provision is made for at least one first sensor 194, which delivers signals characterizing the state of the air, which is fed to the internal combustion engine. A second sensor 177 delivers signals characterizing the state of fuel metering system 180. At least one third sensor 191 delivers signals characterizing the state of the exhaust gas upstream of the exhaust gas aftertreatment system. At least one fourth sensor 193 delivers signals characterizing the state of exhaust gas aftertreatment system 115. Moreover, at least one sensor 192 delivers signals characterizing the state of the exhaust gases downstream of the exhaust gas aftertreatment system. Preferably used are sensors which measure temperature values and/or pressure values. Moreover, sensors may also be used which characterize the chemical composition of the exhaust gas and/or of the fresh air. They are, for example, lambda sensors, NOx sensors or HC sensors.

The output signals of first sensor 194, of third sensor 191, of fourth sensor 193 and of fifth sensor 192 are preferably applied to exhaust gas aftertreatment control unit 172. The output signals of second sensor 177 are preferably applied to engine control unit 175. It is also possible to provide further sensors (not shown), which characterize a signal with respect to the driver's input or further ambient conditions or engine operating states.

In the specific embodiment shown, a compressor 106 is positioned in induction pipe 105, and a turbine 108 is positioned in exhaust pipe 110. The turbine is driven by the exhaust gas flowing through and drives compressor 106 via a shaft not shown. The air quantity the compressor compresses may be controlled by a suitable control.

Furthermore, a throttle valve 104a is situated in intake line 105, by the use of which the supply of fresh air into the internal combustion engine may be influenced. Throttle valve 104a is also able to be controlled by control unit 175.

Furthermore, pipe 110 is connected to intake line 105 via an exhaust gas recirculation line 102. Disposed in exhaust gas recirculation pipe 102 is an exhaust gas recirculation valve 104b, which is likewise controllable by control unit 175.

In the specific embodiment shown, a throttle valve, an exhaust gas recirculation and a controllable exhaust gas turbocharger are provided. According to the present invention, just a throttle valve or an exhaust gas recirculation may be provided.

It is particularly advantageous if the engine control unit and the exhaust gas aftertreatment control unit form one structural unit. However, provision may also be made for them to be designed as two spatially separated control units.

In the following, the procedure of the present invention is described using as an example a particulate filter which is used particularly for direct-injection internal combustion engines. However, the procedure according to the present invention is not limited to this use; it may also be used for other internal combustion engines having an exhaust gas aftertreatment system. It can be used, in particular, in the case of exhaust gas aftertreatment systems featuring a combination of a catalytic converter and a particulate filter. Moreover, it is usable in systems which are equipped only with a catalytic converter.

Based on the existing sensor signals, engine control 175 calculates control signals to apply to fuel metering system 180. This then meters in the appropriate fuel quantity to internal combustion engine 100. During combustion, particulates can develop in the exhaust gas. They are trapped by the particulate filter in exhaust gas aftertreatment system 115. In the course of operation, corresponding amounts of particulates accumulate in particulate filter 115. This impairs the functioning of the particulate filter and/or of the internal combustion engine. Therefore, provision is made for a regeneration process to be initiated at certain intervals or when the particulate filter has reached a certain loading condition. This regeneration may also be referred to as a special operation.

The loading condition is detected, for example, on the basis of various sensor signals. Thus, first of all, it is possible to evaluate the differential pressure between the input and the output of particulate filter 115. Secondly, it is possible to ascertain the loading condition on the basis of different temperature and/or different pressure values. In addition, it is possible to utilize further variables to calculate or simulate the loading condition. A suitable procedure is known, for example, from German Patent DE 199 06 287.

When the exhaust gas aftertreatment control unit detects the particulate filter to have reached a certain loading condition, the regeneration is initialized. Various possibilities are available for regenerating the particulate filter. Thus, first of all, provision may be made for certain substances to be fed to the exhaust gas via control element 182, which then cause a corresponding reaction in exhaust gas aftertreatment system 115. These additionally metered substances cause, among other things, an increase in temperature and/or an oxidation of the particulates in the particulate filter. Thus, for example, provision can be made for fuel and/or an oxidizing agent to be supplied via control element 182.

Usually, provision is made to determine the loading condition on the basis of a variety of variables. By comparison to a threshold value, the different conditions are detected and the regeneration is initiated as a function of the detected loading condition.

Exhaust gas recirculation is provided in order to reduce the nitrogen oxides in internal combustion engines. The portion of recirculated exhaust gases and/or the air quantity supplied to the internal combustion engine, must be precisely adjusted, since the particulate emissions rise if the exhaust-gas recirculation rate is too high, but the NOx emissions increase if the exhaust gas recirculation rate is too low. To achieve this, a control and/or regulation of the exhaust gas recirculation rate as a function of the operating point are/is usually provided.

According to the present invention it is provided that the concentration of oxygen in the exhaust gas is recorded. The concentration of oxygen or the volume flow of oxygen may, for instance, be measured by a lambda probe and/or be calculated or simulated from operational parameters of the engine. Thus, sensor 191 may, for example, be designed as a lambda probe. A considerable importance for the burn-off speed is attributable to the oxygen supply in the exhaust gas.

According to the present invention, from the loading state and the oxygen content it is ascertained whether the exhaust gas aftertreatment system is able to be damaged by an oxidation that is too rapid. If this is a possibility, the oxygen content in the exhaust gas is purposefully reduced so as to limit the burn-off speed.

There are a number of options available for this purpose. On the one hand, it may be provided that the exhaust gas recirculation rate is increased, that a throttle valve in the intake tract of the internal combustion engine is closed, or at least partially closed, and/or that additional fuel is injected which reduces the oxygen content, but does not contribute to the torque.

Figure 2:
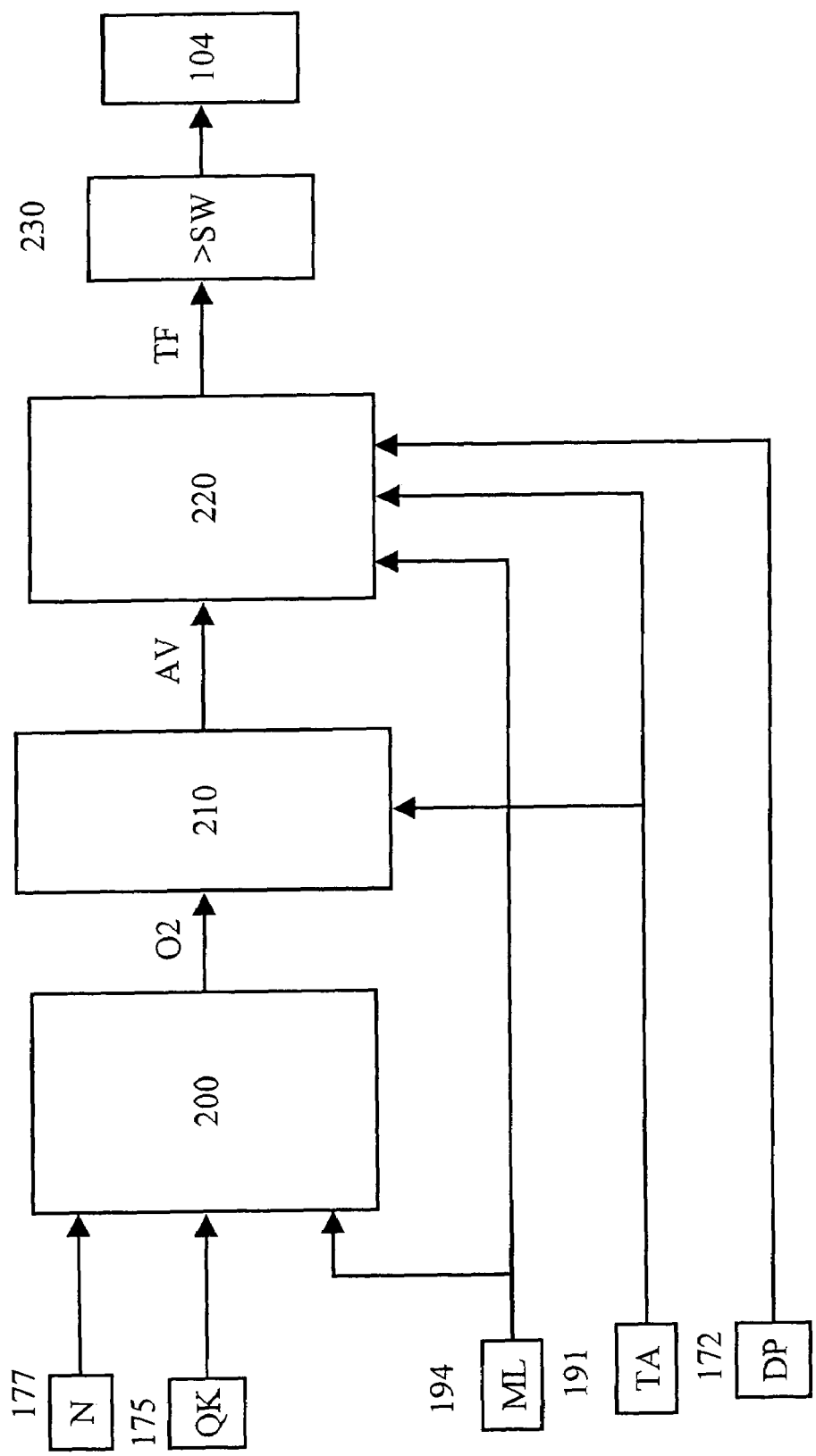
FIG. 2 shows a flow chart of the method according to the present invention.

FIG. 2 illustrates the procedural manner according to the present invention in exemplary fashion. Elements which have already been described in FIG. 1 are denoted by corresponding reference symbols. Sensor 177, which is situated at injection device 180 or at internal combustion engine 100, emits a signal N with respect to the rotational speed of the engine. Engine control 175 makes available a signal QK which characterizes the fuel quantity to be injected. Sensor 194 emits a signal ML which characterizes the fresh air quantity supplied to the internal combustion engine. Sensor 191 emits a signal TA which characterizes the exhaust gas temperature upstream from exhaust gas aftertreatment system 115. Instead of sensor 191, other sensors, such as sensor 192 or 193, may make available signals which characterize with respect to exhaust gas temperature in the exhaust gas aftertreatment system and/or downstream from it.

Moreover, exhaust gas aftertreatment control 172 makes available a signal DP which characterizes the loading state of exhaust gas aftertreatment system 115. This signal essentially corresponds to the particulate quantity in the exhaust gas aftertreatment system. Furthermore, a controller 104 is provided, by which it is possible to reduce the oxygen quantity in the exhaust gas. Thus, for example, it may be provided that a throttle valve 104a or an exhaust gas recirculation valve 104b may be correspondingly controlled.

Various signals which characterize the operating state of the internal combustion engine, such as the rotational speed N, the injected fuel quantity QK and the fresh air quantity ML are supplied for an oxygen quantity calculation 200. It delivers a signal O2, which characterizes the oxygen content in the exhaust gas, to burn-off speed calculation 210. The latter delivers a signal AV which characterizes the burn-off speed in the exhaust gas aftertreatment system. Furthermore, a signal with respect to the exhaust gas temperature TA is supplied to exhaust gas speed calculation 210.

Various signals characterizing the operating state of the internal combustion engine and of the exhaust gas aftertreatment system, such as air quantity ML, exhaust gas temperature TA, particulate quantity DP and burn-off speed AV are supplied to a temperature determination 220. This makes available a temperature value TF, which characterizes the filter temperature attainable by the burn-off, or the possible temperature increase.

This signal TF reaches a threshold value query 230, which, in turn, activates a control element 104.

Starting from various variables which characterize the operating state of the internal combustion engine, such as the rotational speed N and the injected fuel quantity QK and/or the drawn in fresh air quantity ML, the oxygen quantity calculation calculates the variable O2, which characterizes the oxygen content and/or the oxygen mass flow in the exhaust gas.

In one alternative refinement it may also be provided that this variable is directly recorded using a sensor, such as a lambda sensor in the exhaust gas, or that, under certain operating conditions, the variable is directly recorded and under others is calculated.

Burn-off speed calculation 210 calculates the burn-off speed, starting from the variable O2 thus ascertained, from exhaust gas temperature TA and possibly from further variables which characterize the exhaust gas aftertreatment system.

Starting from a variable DP, which the particulate quantity stored in the exhaust gas aftertreatment system, from exhaust gas temperature TA, from the air quantity ML and from burn-off speed AV, temperature calculation 220 calculates a variable TF which corresponds to the temperature in the exhaust gas tract which is able to be attained by the oxidation, or rather, a variable TF is determined which characterizes the temperature increase based on the oxidation.

This variable TF is compared to a threshold value SW in threshold value query 230. If the variable TF is greater than threshold value SW, actuator 104 is activated in such a way that the oxygen concentration in the exhaust gas is reduced. This means that the oxygen concentration in the exhaust gas is reduced if the expected temperature increase, based on the reaction in the exhaust gas aftertreatment system, is greater than a threshold value and/or if the expected temperature, which will probably be attained based on the reaction in the exhaust gas aftertreatment system, is greater than a threshold value.

Preferably, the reduction of the oxygen content takes place by an increase in the rate of exhaust gas recirculation, a torque-neutral late injection of fuel into the combustion chamber, a fuel addition into the exhaust gas system, an initial throttling of the engine by a throttle valve and/or by a combination of these various measures.

What is claimed is:

1. A method for controlling an internal combustion engine that includes a particulate filter situated in an exhaust gas aftertreatment system, in which a regenerating process is provided to reduce a loading of the particulate filter, comprising:
   determining a parameter that characterizes an intensity of a reaction in the particulate filter, starting from an operating parameter that characterizes at least one of a state of the internal combustion engine and a state of the particulate filter; and
   introducing a measure for reducing a reaction speed in the particulate filter when a threshold value is exceeded by the determined parameter.

2. The method as recited in claim 1, further comprising:
   determining a parameter that characterizes at least one of a reaction temperature and a temperature change brought about by the reaction in the particulate filter.

3. The method as recited in claim 1, further comprising:
   determining a parameter that characterizes at least one of a loading state of the particulate filter, an exhaust gas temperature, an air quantity, and a burn-off speed.

4. The method as recited in claim 3, wherein:
   the parameter that characterizes the at least one of the loading state of the particulate filter, the exhaust gas temperature, the air quantity, and the burn-off speed may be specifiable starting from a variable that characterizes at least one of an oxygen content in an exhaust gas and the exhaust gas temperature.

5. The method as recited in claim 4, wherein:
   the variable characterizing at least one of the oxygen content in the exhaust gas and the exhaust gas temperature is at least one of:
   specifiable starting from a variable that characterizes at least one of the air quantity, a rotational speed, and an injected fuel quantity, and recorded using a sensor.

6. The method as recited in claim 1, further comprising at least one of:
   reducing a fresh air quantity supplied to the internal combustion engine so as to reduce the reaction speed; and
   metering a fuel so as to not contribute to a torque.

7. A device for controlling an internal combustion engine that includes a particulate filter situated in an exhaust gas aftertreatment system, in which a regenerating process is provided to reduce a loading of the particulate filter, comprising:
   an arrangement for determining a parameter that characterizes an intensity of a reaction in the particulate filter, starting from an operating parameter that characterizes at least one of a state of the internal combustion engine and a state of the particulate filter; and
   an arrangement for introducing a measure for reducing a reaction speed in the particulate filter when a threshold value is exceeded by the determined parameter.

* * * * *